July 26, 1927.

L. N. SOUTHMAYD

CUSHION TIRE

Filed May 18, 1923

1,636,759

INVENTOR.

BY Leon N. Southmayd

ATTORNEY.

Patented July 26, 1927.

1,636,759

UNITED STATES PATENT OFFICE.

LEON N. SOUTHMAYD, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

CUSHION TIRE.

Application filed May 18, 1923. Serial No. 639,732.

This invention is an improvement in cushion tires. Solid rubber tires have been made with a cored out circumferential opening adjacent the base and extending upwardly into the body of the tire. These tires have been known as cushion tires and they all carry their loads much more like solid than like pneumatic tires. But my improved cushion tire carries even its very heavy loads in such a way as to give a better combination of the solid tire advantages and the characteristic pneumatic tire disbtribution of the loads in the improved cushion tire. This improved cushion tire is designed for heavy work like solid tires rather than for the lighter work of pneumatic tires. One of its principal objects is to provide a better cushion tire to do the work of a solid tire in automobile truck use, and yet last longer by reason of a construction which will withstand the grief of severe service with less internal fatigue than solid or cushion tires generally.

The invention will be clear from the accompanying drawings and description of one or two embodiments.

Figure 1:
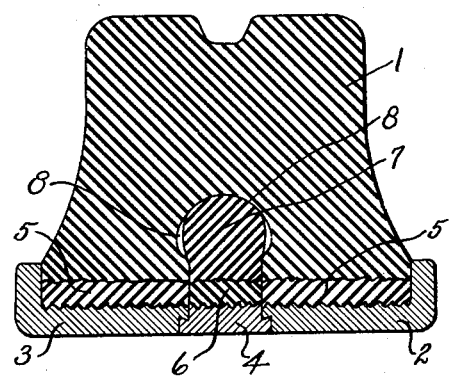
Fig. 1 is a cross sectional view of my assembled tire and rim.

The main body of the tire 1 is made upon the two solid rim sections 2 and 3. The rubber stock of this body is the same as that used in any standard solid or cushion tire. The rubber is bound to the rim sections by the hard rubber base 5. To provide the central circumferential opening outlined by the curved line 8 in Fig. 1 a metal core is used. Such a core is assembled with the rim sections 2 and 3, the hard rubber 5 and the body rubber 1 is laid on and the whole vulcanized at one time in a closed mold. The core is then removed and the space defined by 8 is left adjacent the base and all around the tire. If the rim sections 2 and 3 are then held apart by a spacing ring forming an additional section of the rim, the tire can be used as an ordinary cushion tire. Such a tire, for example, is shown in German Patent 216,820, dated March 11, 1908.

Figure 2:
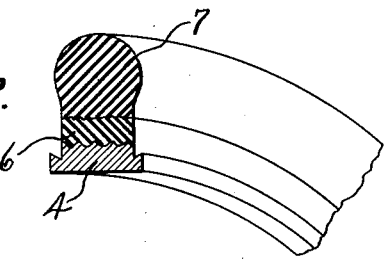
Fig. 2 is a perspective of a portion of that part of the tire body which is inserted in the circumferential opening in the main body of the tire.

According to my invention I start with a cushion tire like that just described, but upon the spacing ring section 4 of the rim I build what amounts to a small solid tire as shown in Fig. 2. The hard rubber base 6 joins the soft rubber 7 to the rim section 4 and the whole is vulcanized together in a closed mold under pressure the same as solid tires are cured on the rim. This vulcanizing operation is separate from that in curing the main body of the cushion tire and the rubber 7 is preferably of a more yielding character than the rubber 1. The small solid tire is, however, combined to function with said cushion tire in use.

I now take the solid tire on rim section 4 and insert it in the circumferential open cavity of the body 1 as shown in Fig. 1. The cavity is thereby closed but not completely, as I will explain. The insertion of the solid tire may be facilitated by cutting the small solid tire transversely like a split rim or by making it in sections but circumferentially complete when assembled. Various ways will readily occur to those skilled in the art for this operation. My tire thus assembled will function in a peculiar way of its own.

By inserting a solid tire within a cushion tire cavity of slightly larger cross section than that of the solid tire, I utilize a certain property of rubber in a new way. This property is the incompressibility of rubber. If confined, no amount of pressure will decrease its volume. If not confined, its mass readily moves away from an area of pressure but its volume remains the same. Therefore in my improved tire a load will first act to decrease the cross sectional area of the cavity just above the ground contact. This will cause the solid tire to completely fill the cavity at that portion above the ground contact. Thereupon the combined tire just above the ground contact will support the load like a solid tire. But an increase in load on the tire will further decrease said area of the cavity because the rubber of the small solid tire 7 can be safely displaced circumferentially within the limits of its elasticity. As such rubber is thus displaced the cavity is filled through a longer and longer arc depending on the increase in pressure of the load within the obvious limits. The displacement of the rubber of the small solid tire under the load resists the pressure of the load and changes the character of the resistance of the cushion tire body 1 to advantage. One particular characteristic of my invention is that after the solid tire has filled the cavity of the cushion tire at one small arc or portion just above the ground contact the solid tire rubber must then be displaced circumferentially from such portion as the load increases. This kind of displacement causes the cavity to be filled through a longer arc and the internal area of the resistance to pressure is greatly increased. This resistance is the yielding resistance of the rubber, particularly that of the solid tire 7, acting within its elastic limit, and good elastic rubber next to air under pressure offers the best resistance for tire work. The result of spreading the area of tire resistance internally by a different movement of the rubber displaced is that one can more nearly approach a combination in a cushion tire of the advantages of a solid and pneumatic tire. An ordinary cushion tire is like a pneumatic tire in the fact that its cavity forms an air space on account of which the tire walls may readily bend. But the result of such bending in cushion tires under heavy service conditions raises many difficulties. For example, the cushion tire without the air pressure support may bend to such a degree as to quickly disintegrate. If the cavity is made smaller to cut down the amount of bending, then the load strains are concentrated over such a much smaller area that the elastic limit of the rubber is more likely to be exceeded with the result that the tire disintegrates for that reason.

Figure 3:
Fig. 3 is a diagrammatic view of comparative load distributing areas referred to in the description.

In Fig. 3 I have illustrated the point of increasing the area of resistance to load by my tire in comparison with solid and pneumatic tires. The line through the centers of the figures illustrates the line of travel of a tire. I have, for purposes of illustration, shown areas A, B, C, and D all in full lines to illustrate the same road contact, due to similar tread surfaces, when a pneumatic, a solid, a cushion, and my tire respectively are placed on the road without any load on them. The dotted lines illustrate the tendency to increased road contact when loads are placed on the tire. I do not offer these figures as exact representations but only as a diagrammatic showing of the tendencies described. The pneumatic A tends to spread as a longitudinal ellipse. The solid B tends to spread as a transverse ellipse. But C and D will spread according to whether the rubber moves into the cushioning cavity or moves outwardly. Generally they spread outwardly when under heavy loads, like a solid tire but not to such a marked degree, and I have so illustrated them. The internal solid tire within my cushion tire acts under load to spread the pressure circumferentially over the internal area of the cavity as it fills the latter. The walls of the cavity while they bend are increasingly resisted by the circumferential spread of the solid tire. Therefore, they do not bend as much as the ordinary cushion tire and yet do bend enough to spread pressure over the internal area of the cavity. In this respect and to the degree permitted by the elastic limit of the rubber 7 the pressure is necessarily spread like the pressure in a pneumatic tire. While the actual area of contact of my tire with the ground is more like the solid in lateral spreading action than the cushion tire, the internal dissipation of the forces acting is spread over a much wider area of the tire, in this respect being like a pneumatic tire in the longitudinal spreading action. To indicate this internal spreading of pressure, I have shown the dot and dash line on D showing the area within the tire over which a resistance is set up against the load.

I am aware of the various proposals in many prior patents concerning the use of so-called fillers within the cavities of both pneumatic casings and cushion tire cavities. But my invention is not within the disclosure of such patents. I provide a solid tire within a cushion tire to completely fill the cavity but only through a small arc just above the ground contact, and then only when a predetermined load has caused the cavity walls to bend inwardly enough for my purpose. Then as the load is increased and due to the incompressibility of rubber, I obtain an internal substantial elastic action outwardly, more like the action of air under pressure, to spread the resistance to the load over a longer arc and thus I dissipate many of the forces tending to destroy a solid or cushion tire under heavy loads.

After my disclosure those skilled in the art can adapt the means for accomplishing the purpose of the invention in many ways. Solid and cushion tires are designed according to the loads they are to carry or the roads or speed they use in service, and therefore their forms tend to vary more widely as they are applied to different uses.

Figure 4:
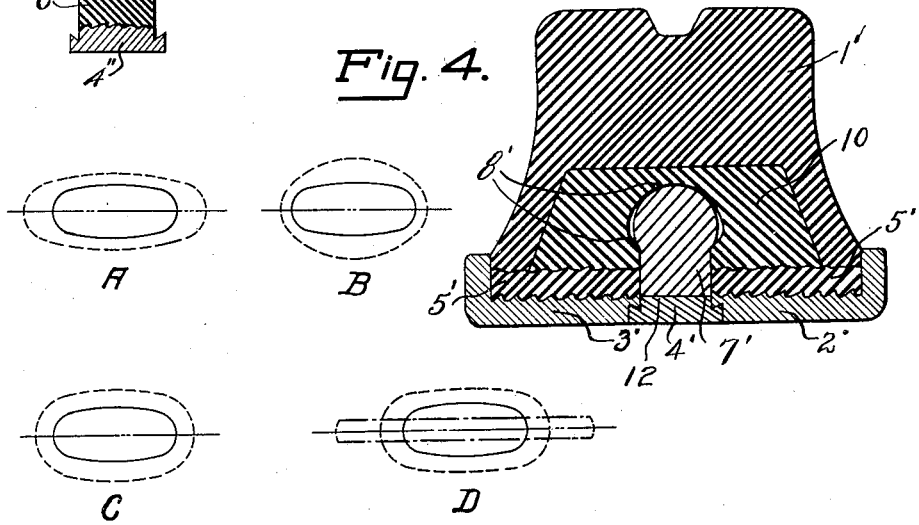
Fig. 4 is a cross sectional view like Fig. 1 but of a modified construction.

In Fig. 1 the internal solid tire is shown in contact at the top but spaced at the sides of the cavity 8. This same relation exists all around the tire. As the load is imposed on this tire the rubber 7 very quickly spreads out to fill the cavity. Therefore the functioning of the solid tire 7 within the body 1 would begin practically at once with a normal load. But it may be desired to have the body 1 act purely as a cushion tire with a given load and have the combination work only under other and heavier loads. If so, the degree of the cavity collapse before it is filled can be arranged for the purpose by making the relative cross sections as desired, even to the point where the solid tire insertion acts only when the cushion tire is overloaded and as a guard against overloading results. But I prefer to have the internal spreading action take place as a load resisting feature in all expected uses of the tire to thus get all the advantages of my invention. I realize that many variations can be readily suggested on the form shown. For example, instead of binding the solid tire 7 to base 6 and rim section 4 it may be used without this attachment and so as to be free to move circumferentially as a body. This freedom may be advantageous to avoid exceeding the elastic limit of the rubber in displacing it circumferentially while bound to rim section 4 at the base. Such a construction is shown in Fig. 4, where the solid tire 7' is disconnected with the base 4' along the line 12.

The solid rubber 7 is preferably of a different compound than the body 1. It may be made of the most yielding and elastic character to advantage because it will then move farther and quicker and still return to normal without destruction. The rubber of the body 1 must be of a compound suitable for wearing qualities, as regular solid tire stock. In Fig. 4 I have illustrated a section like that of Fig. 1 except that the walls of the cavity 8' are made of more yielding and elastic rubber than the compound rubber of body 1', just as the solid tire 7' is more yielding and more elastic. By this arrangement the walls of the cavity will transmit the forces to which they are subjected quicker and better. I consider the internal arch of very elastic rubber 10, with a substantial thickness (preferably enough to leave only protecting walls of the harder rubber at the sides) surrounding the cushion tire cavity, a marked improvement considering the desired action of the forces to be absorbed by movement towards and within the cavity in any cushion tire as well as towards the rim or base. The body of more resilient or livelier rubber 10 will give a better bending action and recovery to the walls of the cavity than the ordinary compounded rubber necessarily used for the wear resisting tire portion. The construction last described may be used without the central rubber 7' in the cavity. I prefer, however, to use the whole combination, particularly as the central rubber 7' will start to resist the movement of the rubber 10 and prevent too great a collapse under load.

Figure 5:
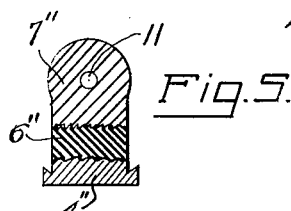
Fig. 5 is a section corresponding to Fig. 2 but showing a modification.

I prefer to have the solid tire 7 solid in fact, but from a functional standpoint I realize that a small enough opening (as at 11, Fig. 5) could be placed therein at the center or base or elsewhere to close up as and when, or slightly after, the space between the tire and cavity is closed for the solid tire to fill the cavity. Therefore, in the broadest functional sense I refer to the closing of the tire cavity within the cushion tire not necessarily by a solid tire but by a tire that will act for the practical purpose I have described and in essentially the same way.

Having thus described my invention, I claim:

1. A cushion tire for heavy duty service comprising a main body portion of generally trapezoidal cross-section and having a central circumferential recess along its inner periphery, the tire being thereby divided into a relatively thick tread and thick converging supporting walls adapted normally to receive the load and support the vehicle by their compression and to cushion the load by bending inwardly into the recess, a small solid tire located within said recess of cross-sectional area slightly less than that of the recess and substantially in contact with the recess at its outer periphery, and means for supporting the main tire and the small tire from the wheel of the vehicle, all constructed and arranged so that when the tire is placed under load the area of contact of the small tire with the walls of the recess will increase with the load and will thus afford increasing support to the main tire against collapse of said walls.

2. A cushion tire for heavy duty service comprising in combination three circumferential rim sections, a small tire mounted on the intermediate rim section, and a cushion tire body with its cavity containing said small tire and having its spaced legs independently mounted on the two remaining rim sections.

3. A cushion tire for heavy duty service comprising in combination a tire body of thick rubber walls with an inverted U-shaped cross section, the inner sides being vulcanized on two spaced rim sections, an intermediate rim section, and a second separate tire body supported from the intermediate rim section and adapted to elastically support the first tire body when the latter starts to collapse.

4. A cushion tire for heavy duty service comprising in combination a cushion tire body formed with an internal cavity and a small solid tire, independent and mounted on separate rim sections, all assembled with the solid tire contained within the cushion tire cavity, but not quite filling it, while the rim sections are assembled with said tires to form a rim support for the whole tire.

5. A cushion tire for heavy duty service comprising a suitable body of molded rubber for the cushion frame with a substantial cavity circumferentially disposed adjacent the base, and a lining of substantial thickness around said cavity, such lining being vulcanized to the body rubber frame and made of livelier rubber than the main rubber body, whereby the rubber may be more readily displaced to enter said cavity under service loads imposed upon the tire.

LEON N. SOUTHMAYD.